United States Patent [19]
Adams

[11] 3,735,563
[45] May 29, 1973

[54] REGENERATING DESICCATOR
[76] Inventor: Carlton D. Adams, 5 Carroll Avenue, Boylston, Mass. 01505
[22] Filed: Nov. 4, 1971
[21] Appl. No.: 195,670

[52] U.S. Cl..................................55/179, 55/208
[51] Int. Cl. ................................................B01d 53/04
[58] Field of Search....................55/33, 62, 74, 179, 55/208, 387, 75, 388, 389; 210/282

[56] References Cited
UNITED STATES PATENTS 3,621,585  11/1971  Robertson.............................55/179
3,264,803  8/1966  Read......................................55/208

*Primary Examiner*—Charles N. Hart
*Attorney*—Charles R. Fay

[57] ABSTRACT

Desiccator for plastic molding material comprising a pair of alternatingly operative drying towers, drying air in one tower and regenerating the desiccant in the other, in an auto-matic timed sequence, the towers each having means forcing the moist air through the desiccant in a tortuous, e.g., helical path, and the dried air to a plenum chamber hopper for the molding material.

7 Claims, 2 Drawing Figures

PATENTED MAY 29 1973

3,735,563

REGENERATING DESICCATOR

BACKGROUND OF THE INVENTION

Some plastics must be dried or heated prior to molding or extruding and this may be accomplished in a plenum chamber hopper by forcing dried warm air through the granular or comminuted plastic material in the hopper. As the plastic moves down through the hopper it becomes warmer and drier, and it is a desirable consideration to provide that the plastic reaches a predetermined temperature and its driest state just as it exits from the hopper to be processed.

The warmed dry air is continuously obtained from a separate but connected recirculating desiccating chamber in which the moist air issuing from the plenum hopper is dried and warmed in a continuous flow through desiccant material, which however must be regenerated periodically.

It has been found that the moist air is very apt to find and follow a relatively restricted path through the desiccant material and thus make use of only a portion thereof, resulting in low efficiency of the desiccator and frequent periods of regeneration. It is the purpose of this invention to improve the efficiency of the desiccator, and of the entire system.

SUMMARY OF THE INVENTION

A pair of upright and similar desiccating towers are provided with an helical auger-like baffle. These towers are provided centrally of the baffle with elongated heating tubes which heat the desiccant and regenerate it when it becomes moist through the action of extracting moisture from the moist air that has been run through the plenum chamber hopper holding the plastic powder, etc., material. Of course the air in the chamber picks up moisture while warming the plastic and is returned to the tower which is being operated at the time for drying this air, drawing off the excess moisture and returning the same to the hopper.

When this tower becomes too moist as to the desiccant to operate efficiently it is then switched to regenerate the desiccant so as to be ready for efficient operation at the next change over.

The helical or auger construction forces the air to follow a helical path to the tower about the central elongated tubular heating chamber, thus passing through substantially all of the desiccant rather than as in the prior art following the line of least resistance, and for this reason the efficiency of the unit is very high, it operates automatically, it takes up a minimum of space, and operates with little if any attention.

PREFERRED EMBODIMENT OF THE INVENTION

Figure 1:
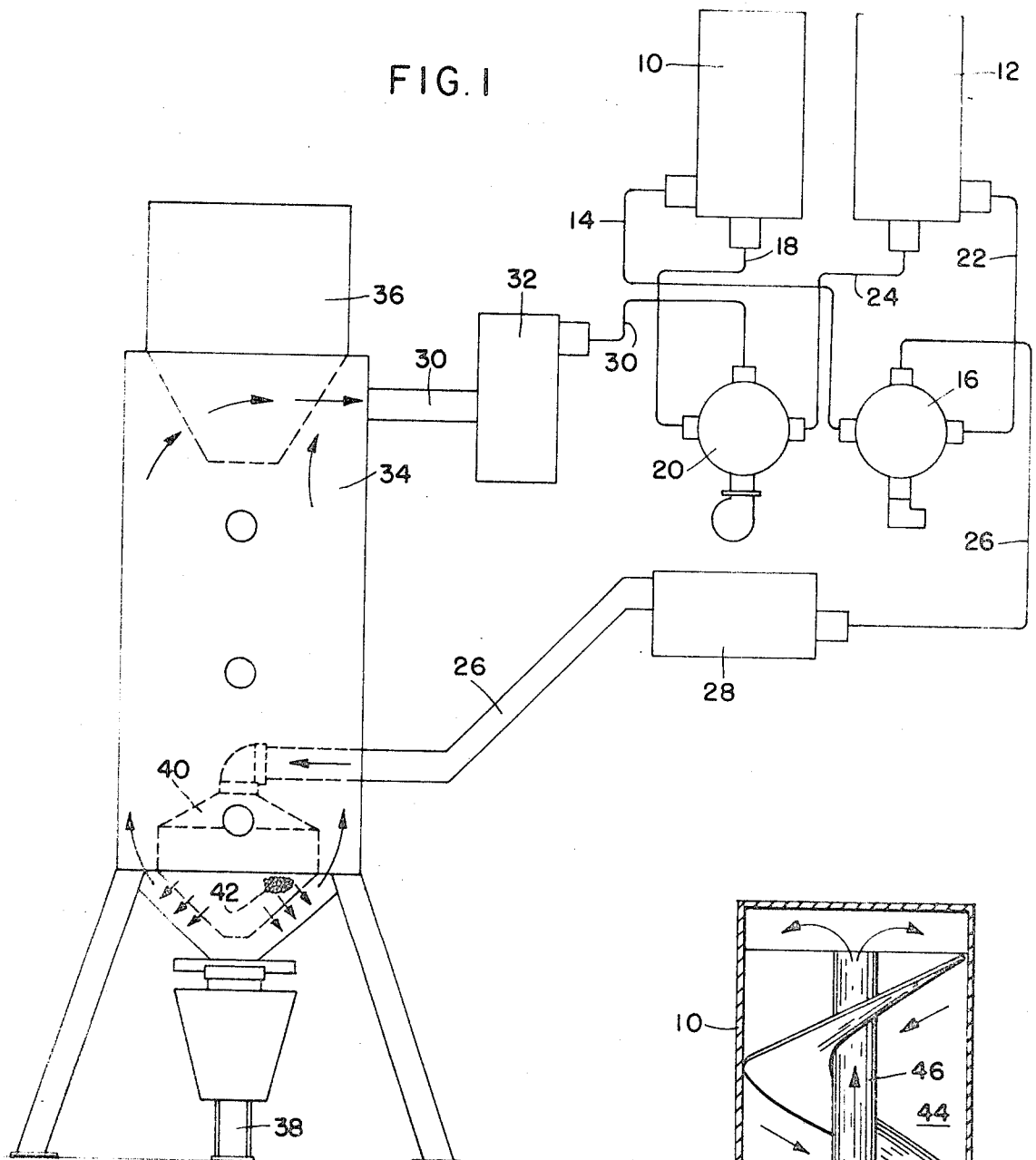
FIG. 1 is a schematic diagram illustrating the action of the desiccator.

Referring now to FIG. 1, the twin towers are indicated at 10 and 12. Tower 10 at the lower end thereof is connected through a conduit 14 to rear valve 16 and through a separate conduit 18 to a front valve 20. Tower 12 is connected in the same manner as by a conduit 22 to the rear valve 16 and by another conduit 24 to the front valve 20.

These valves are automatically operated in timed sequence as will be explained further hereinafter. It is to be particularly noted that the rear valve 16 is connected through a conduit 26, to a dry air heater 28, if desired, to the plenum chamber, and the front valve 20 is connected through a conduit 30 through a fan 32 to the top of the plenum chamber, which is indicated at 34.

The plenum chamber 34 is a "diffuser" hopper. The material to be processed enters at the top thereof as at 36 and is fed through the bottom at 38 to the processing machine. The conduit 26 leads into an air diverter 40 so that the air is distributed downwardly through a screen 42 to the inclined sides of the bottom of the chamber operating upon the material most directly just as it is to be fed to the processing machine and thereby drying and warming the same to the desired degree.

This dry and warmed air is thereupon moved upwardly according to the arrows and out through conduit 30 being at this time very moist and being forced alternatively through conduit 18 to the bottom of tower 10 or through conduit 24 to the bottom of tower 12, depending upon the position of the valves 16 and 20 which as stated above are controlled automatically for this purpose. The dry air entering through the conduit 26 to the plenum chamber is derived through line 14 or alternatively line 22 through the rear valve 16.

When the moist air is directed into either tower it proceeds upwardly through the desiccant 44 in the tower to be dried thereby, thence passing into a tubular finned heating tube centrally located in each tower, these tubes being indicated by the reference numeral 46, and the air then being dried and warmed is passed out through the bottom of the respective tower at 14 and 22 and then passed through conduit 26 as described above.

When a tower is regenerating, however, the moist air is fed upwardly through for instance conduit 16 and 24, in a reverse direction through the heating tubes 46 and then down through the desiccant and then being moisture laden is discharged.

Figure 2:
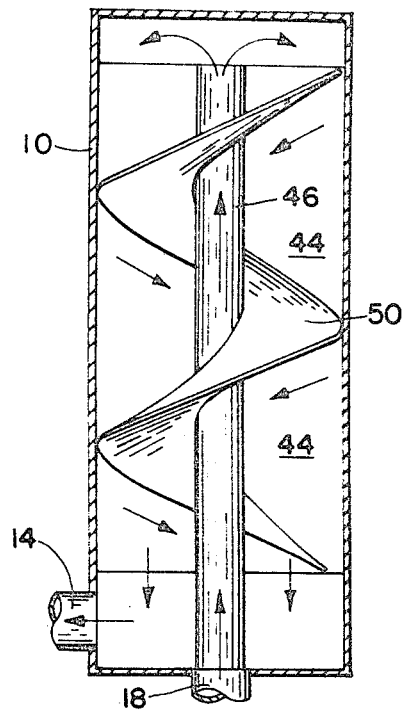
FIG. 2 is a vertical sectional view illustrating one of the desiccator towers and particularly the helical baffle.

Referring now to FIG. 2, it will be seen that each tower is provided with a complete helical baffle indicated at 50 surrounding the heating tubes and extending between the walls of the tower and the heating tubes and as shown by the arrows whichever direction the air is flowing, it has to follow a helical path thus passing through substantially all of the desiccant and thereby utilizing practically all of the desiccant rather than finding a path of least resistance directly through the desiccant as in the prior art. When this happens only a small portion of the desiccant is ever efficiently utilized by this stream of air and vice versa.

I claim:

1. Desiccating apparatus for a plenum chamber hopper for plastics, said apparatus comprising a pair of desiccating towers, an elongated heating means in each tower centrally arranged therein and surrounded by desiccant, a valve for each tower, a conduit to each valve for moist air from the hopper, a conduit from each valve for dry air to the hopper, a conduit from each valve to each tower for moist air, a conduit to each valve from each tower for dry air, said valves being selectively alternately actuated in unison for supplying moist air to one tower for drying this air and returning it to the hopper while at the same time passing heated air through the other tower to dry the desiccant therein, including a continuous baffle in each tower forcing the air to travel a tortuous path therein and thereby causing the air to pass through substantially all of the desiccant.

2. The apparatus of claim 1 wherein the heating means are hollow and the air passes through the heating means and through the desiccant.

3. The apparatus of claim 1 wherein the baffle surrounds the heating means.

4. The apparatus of claim 3 wherein the baffle is in the form of a spiral.

5. The apparatus of claim 4 wherein the spiral baffle surrounds the heating means in each tower.

6. The apparatus of claim 4 wherein the desiccant substantially fills each tower and the baffle is embedded therein.

7. The apparatus of claim 1 wherein the heating means are hollow and the air passes through the heating means and through the desiccant in one tower and through the desiccant, and then through the heating means in the other tower.

* * * * *